Figure 1:
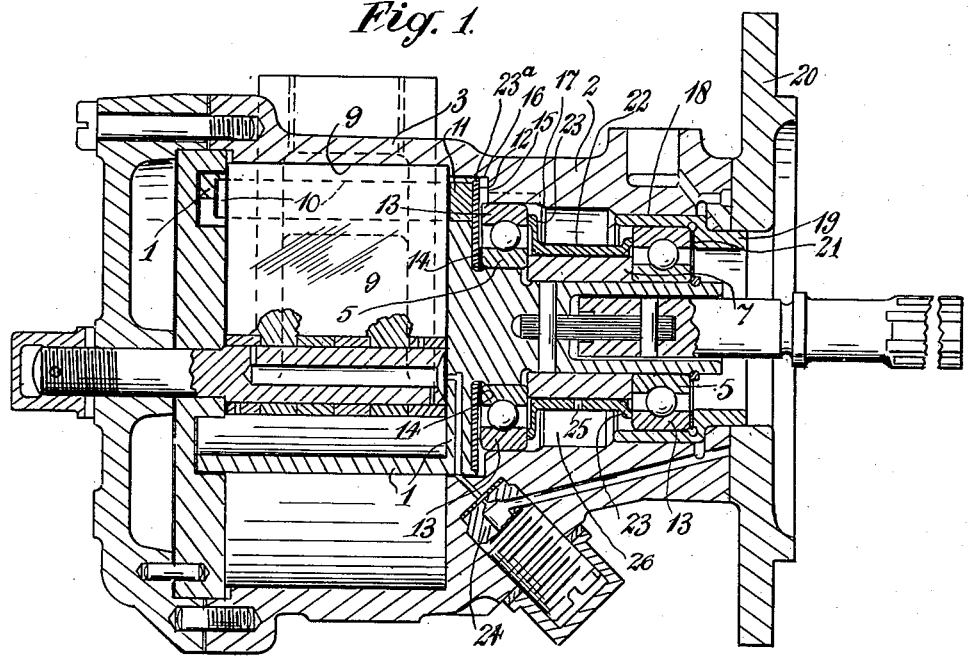

Dec. 14, 1943.　　　F. C. FULCHER　　　2,336,474
SEALING DEVICE FOR JOURNALS
Filed Jan. 8, 1941

INVENTOR
Frank Christian Fulcher
BY
Albert F. Nathan
ATTORNEY

Patented Dec. 14, 1943

2,336,474

UNITED STATES PATENT OFFICE 2,336,474

SEALING DEVICE FOR JOURNALS

Frank Christian Fulcher, Kentsbank, Grange-over-Sands, England

Application January 8, 1941, Serial No. 373,559
In Great Britain January 20, 1940

8 Claims. (Cl. 308—187.1)

The present invention relates to a rotary pump of the vane or blade type in which the rotor is eccentrically mounted with respect to the chamber within which it rotates. Such a pump when designed for duty as a vacuum pump is well suited for use on aircraft for the operation of suction driven flight instruments and gyro-pilots and when designed as a pressure pump it may be used for example to charge the cabin or other occupied interior of aircraft with extra air. In some cases such a pump serves a dual purpose, e. g., when the pump, used primarily for the operation of suction driven instruments, is occasionally used to provide ample discharge pressure for the operation of de-icer equipment.

The rotating parts of these pumps require to run with fine clearances with the fixed parts if they are to operate efficiently, and while provision must be made to lubricate effectively the relatively movable parts this must be done in the case of pumps for use on aircraft without permitting substantially more than the proper amount of oil to enter the pump, since such oil is generally drawn from the engine crank case and it is important to conserve the supply of lubricating oil while in flight.

In one useful type of pump for aircraft use, the eccentrically mounted steel or aluminium alloy rotor is supported by ball bearings within a pump casing and is driven by means of a spring coupling which mates with the accessory drive of the engine and steel or aluminium alloy vanes extend through equally spaced slots in the rotor and move in and out of the rotor as the rotor turns. The vanes maintain constant contact, or close proximity, with the bore of the casing, the vanes being in some cases restrained, by a hollow steel or aluminium centre pin, against inward displacement but being free to centrifuge and being in some cases prevented from uncontrolled centrifuging as by mounting them to rotate upon an axle concentric with the pump casing, the latter type being preferred in cases where the pump is required for the heavier duties of a pressure pump either as its normal function, or otherwise, as when a vacuum pump for controlling instruments in the aircraft is required to be used also for operating de-icing equipment.

Vacuum pumps of the above types are generally operated at high speeds, e. g., up to 4,500 R. P. M., with a substantial degree of vacuum, e. g., four inches to nine inches of mercury inlet suction with a discharge pressure of about four inches of mercury outlet pressure when not operating, and from sixteen to twenty inches of mercury when operating, de-icing equipment. Pumps for supplying the interior of the aircraft with extra air when flying at high altitudes may run at speeds for example of 800 to 4500 R. P. M. For such purposes not only must the pump be constructed to a high degree of efficiency but a pressure system of lubrication must be adopted if the relative movable parts are to be effectively lubricated, and it becomes important to seal off fluid leakage paths in the pump which may not only give rise to loss of inlet suction and discharge pressure but to excessive consumption of oil. Vacuum pumps of the kind referred to frequently run at a normal speed of 2000 R. P. M. at the present time and where I refer to high speed pumps I mean that they should not run at a normal speed of less than 1500 R. P. M.

It is common practice to provide the neck of the pump casing with a mounting flange to fit on one of the standard engine accessory pads or onto a flanged adaptor which in turn fits the engine accessory pad and to house one or more ball or roller bearings which support a journal of the rotor in such neck in open communication with the engine crank case so that in the absence of any bearing sealing means there is a risk not only of loss of inlet suction and discharge pressure through the gap between the races but also of oil from the engine being carried through such gap into the pump in addition to that which is usually supplied under pressure from either an oil pump of the engine lubricating system or from an oil reservoir in which the desired oil pressure is produced by introducing air under pressure into the top of such reservoir.

In some cases the pump is connected for drive from a gear box and generally in such a case the neck of the pump would not be in communication with the gear box so that any leakage of oil out of the pump would either be lost or if it were received into the gear box it may be mixed with other oil which would render the mixture unsuitable for engine lubrication.

However the pump is connected and driven and whether the rotor is supported at each end or at only one end, the access to the working chamber through the ball races may result in loss of vacuum or pressure and the undesired passage of lubricant into or out of the working chamber and the object of this invention is to provide an effective means for sealing the gap between the relatively fast running races of the bearings.

If the use of packing rings compressed between the fixed and rotating parts or of elastic elements secured to one of such parts and pressing against the other is wholly relied upon for the seal between such parts then wear, which cannot be avoided when the pump runs at speed, eventually produces a gap which makes the seal inefficient. In accordance with the present invention I aim at providing a seal in which such wear will preferably be practically eliminated or if it can take place will not break down the seal, and the invention is characterised in that communication between the working chamber and the exterior of the casing by way of the gap between the races of the ball or roller bearing (or bearings) which support the journal or axle portion of the rotor in the extension of the casing is substantially sealed off by means of a non-rotating sleeve which has a pressure seal (or seals) with a non-rotating surface of the pump, e. g., the fixed race of the bearing, and makes a seal with the rotating journal by closely encircling the journal and thus forming a long annular throttling passage between the relatively rotating parts. In the preferred forms of the invention I do not depend on pressure between the rotating and non-rotating parts to make the seal but I may in an alternative combine with such a throttling seal a pressure seal between the rotating parts, e. g., by providing one or more grooves in the shaft and arranging in the groove a ring which springs outwards against the inner surface of the sleeve so that if due to wear, a gap is produced, leakage therethrough must still be hindered by the throttling passage so that a good seal is still maintained. but even where such rings are used it is preferable to avoid pressure or any substantial pressure between the relatively rotating parts by mounting the rings loosely in the grooves rather than pinning them to the journal. It is very desirable to maintain a film of lubricant between the sleeve and the journal and the grooves provide an additional means of holding a lubricant film. besides making a re-entrant addition to the annular passage. It is preferable not positively to anchor the sleeve but to leave this free for some floating movement limited by the shaft. as wear is thereby still further reduced. This can be achieved for example by holding the sleeve in sealing relationship with a transverse fixed face by frictional engagement of the co-operating surfaces which have a scraping fit to promote a closer union between them.

Such transverse face may be engaged by a washer on the sleeve and this washer may be arranged to yield with reference to the sleeve but I prefer to use a washer which does not yield except to the extent necessary to allow for expansion of the sleeve so that it makes contact over its whole sealing face with the co-operating fixed face when it is pressed against the latter.

One or more lubricant supply holes may be provided in the sleeve so that a film of lubricant may be introduced and a film formed between the journal and the sleeve and the sleeve may form the inner wall of a lubricant, e. g., grease, chamber so that the film may be continuously preserved during the running of the pump.

When the rotor is journalled at one end only in two spaced bearings as hereinbefore described, the sealing sleeve may have a pressure seal at each end and preferably closely encircles nearly the whole length of the distance between the bearings. For this purpose the sleeve may have at each end an integral washer with a shallow flange to engage a transverse face of the outer race of the adjacent bearing. The outer races are preferably made a driving fit in the casing and the sealing sleeve, extending between these races, is therefore clamped between them when the bearings have been driven in.

The portion of the journal encircled by the sealing sleeve preferably comprises an attached ring which spaces the inner races of the bearings and where this ring is made of a different metal from that of the sealing sleeve as to cause a differential expansion to take place it is preferred to make the sleeve have the lower co-efficient of expansion.

One constructional example of a pump incorporating my preferred form of seal is illustrated in the longitudinal section shown by Fig. 1 of the accompanying drawing.

Figure 2:
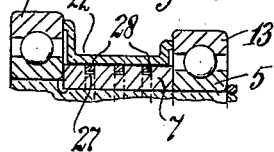
Figure 3:
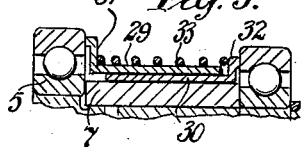

Fig. 2 is a fragmentary longitudinal section of a modified form of the seal shown in Fig. 1 and Fig. 3 is a similar section of another modification.

In the constructional form of the invention illustrated a rotor barrel 1 is supported cantilever fashion, i. e., at one end only, in the neck 2 of the pump casing 3, by a pair of ring type ball bearings mounted in spaced relation along such neck, the inner ball races 5 being spaced apart by a spacing ring 7 rotatable with, and therefore regarded for the purpose of the present invention as a part of, the journal or axle. The vanes 9, of which three may be employed are each slidable in a slot 10 in a guide pin 11 in well known manner. As this arrangement of the vanes forms no part of the present invention more detailed illustration has been omitted. The axle end of the rotor barrel together with a disc 12 which retains the guide pins axially, are appropriately spaced away from the corresponding face of the outer race 13 of the inner bearing by a shim 14 interposed between such disc and the corresponding inner race 5 while the races of such inner bearing are arranged to project beyond a transverse wall 15 of a peripheral stepped recess 16 of the pump casing in which the axle end of the rotor barrel is received so that there is no running contact between such wall and the axle end of the rotor or the retaining disc thereon. In lieu of the shim 14, the retaining disc could be grooved to provide the necessary clearance between the rotor and the outer race 13. The axle end wall of the rotor barrel may be formed with an axially extending flange 23a for the purpose during running of holding central the retaining disc 12 for the rotational guide pins for the rotor vanes.

The inner peripheral surface of the neck of the pump casing is formed with further stepped peripheral recesses 17, 18 with which the outer races 13 of the ball bearings make a tight fit (the smaller race 13 through the medium of a bushing 19), while the inner races are made fast with the rotor axle to rotate therewith. Conveniently and advantageously the further stepped peripheral recesses decrease in diameter as shown towards the mounting pad 20 of the pump and the outer race of the bearing nearer the mounting pad end of the pump is pressed tightly against one or more shims 21 interposed between such race and the shoulder face of the bushing 19 in which it is received, thereby sealing the outer race against such face. The shim might be arranged between the bushing and a transverse wall of the casing.

By fitting the neck of the pump casing with the bushing 19 for the reception of the smaller bearing certain inaccuracies in machining which otherwise might render the casing useless may be corrected in the bushing.

In this form of the invention the pump is sealed from the engine by a sealing sleeve 22 having a peripherally flanged washer 23 at each end thereof, and as the ball bearing nearer the rotor is of greater diameter than the more remote ball bearing, the peripherally flanged washer 23 which engages the outer race of the larger bearing may be of correspondingly larger diameter than the flanged washer at the other end of the sleeve.

The peripheral wall of the recess 16 is preferably of such diameter as to receive the axle end of the rotor with a non-contacting fit so as to leave a working gap therebetween for the passage of lubricant delivered under pressure to the gap by way of the control device 24.

Any possible communication between such gap and the exterior of the pump or the engine crank case by way of leakage paths through the rotor axle bearings is sealed off by the sleeved washer, the opposite peripheral flanged ends of which make a scraped fit with the outer stationary races of the respective ball bearings, the sleeved washer being gripped between the adjacent end faces of the outer stationary races of the pair of ball bearings so as to be retained in fixed fluid-tight contact with such outer races during the running of the pump. The contact of the washer with such outer races may be of a springy character, but in either case the sleeved washer will be positioned against radial displacement by friction so that it can float radially of the pump casing to accommodate any eccentricity between it and the rotor journal.

If desired, lubricating holes 25 may be formed in the sleeve portion of the sealing washer and such holes may be kept supplied with grease during the running of the pump by charging with grease the chamber 26 of which the sleeved washer forms the inner wall.

It will be appreciated that as the pump runs at high speed expansion of the metallic parts must be taken into consideration. It is not generally possible to make the spacing ring 7 and the sealing ring 22 of the same material on account of the close proximity to the surfaces. The co-efficients of expansion of the two materials should be so chosen as to keep the clearance between the rotating surfaces as uniform as possible but where a differential expansion is unavoidable it is preferable to make the sealing sleeve of the material with the lower co-efficient of expansion. For example I may make the ring 7 of duralumin and the sealing sleeve of steel. Throughout the range of temperature say 130° F. to 360° F. (max.) the sealing sleeve would expand less than the spacing ring so that there is a tendency for the clearance between the two parts to diminish. This is not a disadvantage if the clearance is correct for lubrication purposes. Some longitudinal expansion of the sealing sleeve will also take place and it is therefore desirable that the flanges of the sleeve should be capable of yielding to a sufficient extent to compensate therefor.

The specific clearance between the sleeve and the spacing ring will depend to a great extent upon the diameter of the respective parts but if with a pump of the type herein described the diameter of the spacing sleeve is 1⅛" a tolerance of .0003 on the shaft dimension and .0005 on the bore dimension will be found suitable, the tolerance of the shaft being from minus .0006 to minus .0003 and that of the bore from plus .0003 to minus .0002. The surfaces should be accurate machined or ground fit surfaces. The minimum clearance should however be sufficient to allow for the differential expansion above referred to.

Fig. 2 shows how the ring portion 7 of the journal may be provided with external annular grooves 27 in which rings 28 are mounted which expand into contact with the inner wall of the washer sleeve 22.

In the variant form of the invention shown in Fig. 3 the washer device comprises two telescopic sleeves 29, 30 with the washer 31 integral with the outer end of the one and the washer 32 integral with the outer end of the other, a helical spring 33 encircling the telescopic sleeves and bearing against the inner face of each washer so as to urge each washer against the co-operating transverse face of the adjacent ball race. Alternately one sleeve only may be used having a washer at one end only, the spring bearing against the other fixed race or other appropriate fixed part.

It will be observed that there are two sealing zones for each bearing, viz., the pressure seal made by the pressure of the washer against a fixed transverse base and a longitudinal seal made by the sleeve.

The use of two pressure seals as shown, one at each end of the sleeve is generally preferred since this makes leakage all the more difficult.

The pump may be of the general construction shown in my prior applications, Serial Nos. 275,453, filed May 24, 1939 (Patent No. 2,243,898); 275,454, filed May 24, 1939 (Patent No. 2,243,899); 275,456, filed May 24, 1939 (Patent No. 2,243,900); and 275,455, filed May 24, 1939, and 330,224, filed April 17, 1940 (combined in Patent No. 2,243,901).

Figure 4:
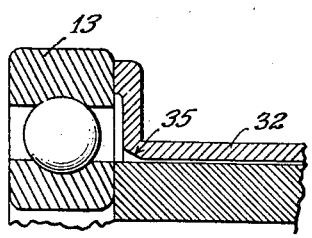

As shown in Fig. 4 the sleeve may be slightly chamfered as shown by numeral 35 at each end to facilitate the entrance of the lubricant.

What I claim is:

1. A sealing device for a journal mounted in and extending from a hollow extension of a housing comprising spaced anti-friction bearings supporting said journal portion in said extension and each comprising inner and outer races, and means for substantially sealing off communication between the interior and the exterior of said extension by way of the gaps between said races comprising sleeve means which closely encircle a part of said journal between said bearings and is clamped in operative position by the fixed races of said bearings in non-rotating and sealing relationship with the adjacent transverse surfaces thereof, said sleeve forming with the casing of said extension a chamber which is adapted to be charged with a viscous lubricant and means for providing communication between said latter chamber and the interior of the sleeve means so as to permit a film of lubricant to enter the clearance between the sleeve means and the encircled part of the journal.

2. A sealing device as in claim 1, in which the sleeve is provided with at least one lubricant hole to provide said communication.

3. A sealing device for a journal mounted in and extending from a hollow extension of a housing comprising spaced anti-friction bearings supporting said journal portion in said extension and each comprising inner and outer races, and means for substantially sealing off communication between the interior and the exterior of said extension by way of the gaps between said races comprising sleeve means which closely encircle a part of said journal between said bearings and is clamped in operative position by the fixed races of said bearings in non-rotating and sealing relationship with the adjacent transverse surfaces thereof, and in which the portion of the journal encircled by the sleeve comprises an attached ring which spaces the inner races of the bearings.

4. A sealing device for a journal mounted in and extending from a hollow extension of a housing, comprising spaced anti-friction bearings supporting said journal portion in said extension and each comprising inner and outer races, and means for substantially sealing off communication between the working chamber and the exterior of said extension by way of the gap between said races comprising telescopic sleeve members the inner one of which closely encircles a part of said journal between said bearings, said sleeve members each having a flange at the remote end, and spring means urging said flanges away from each other, said sleeves being clamped in operative position against such spring force by the engagement of said flanges with the fixed races of said bearings in non-rotating and sealing relationship with the adjacent transverse surfaces thereof.

5. A sealing device for a journal mounted in and extending from a hollow extension of a housing, comprising at least one anti-friction bearing supporting said journal in said extension, said bearing means comprising inner and outer races, said extension including in its structure the outer race of said bearing and means substantially sealing off communication between the interior and the exterior of said extension by way of the gap between said races comprising sleeve means which closely encircle a part of said journal portion adjacent said bearing, said sleeve means including at least one flange formed with a marginal ring projection which is directed towards the bearing to be sealed and provides the sleeve with an end ring sealing face of greater diameter than the gap between the races of said bearing, and means including transverse rigid clamping faces for firmly clamping the sleeve means against axial displacement and for holding said means against rotation relatively to said structure with said sealing face in sealing engagement with one of said clamping faces.

6. A sealing device for a journal mounted in and extending from a hollow extension of a housing comprising at least one anti-friction bearing supporting said journal portion, said bearing comprising inner and outer races, and means substantially sealing off communication between the interior and the exterior of said extension by way of the gap between the said races comprising sleeve means which closely encircle a part of said journal adjacent said bearing races, said sleeve means including a flange at each end formed with a marginal ring projection, said projections being directed away from each other in the direction of the axis of the sleeve means, rigid clamping rings engaging said projections and holding said sleeve means against rotation relatively to said extension structure, one of said clamping rings being the outer race of said bearing to be sealed and the corresponding ring projection being sealed by the clamping face of said race.

7. A sealing device for a journal mounted in and extending from a hollow extension of a housing comprising at least one anti-friction bearing supporting said journal in said extension, said bearing comprising inner and outer races, said extension including in its structure the outer race of said bearing, and means substantially sealing off communication between the interior and the exterior of said extension by way of the gap between said races comprising non-rotating sleeve means and means holding said sleeve means in sealing relation with a non-rotating surface of the said hollow extension, said sleeve means closely encircling said journal so as thereby to form a seal between the sleeve means and the journal, said journal having at least one annular groove containing a radially expansible ring which presses against the interior of a local part of the sleeve means.

8. A sealing device for a journal mounted in and extending from a hollow extension of a housing comprising at least one anti-friction bearing supporting said journal in said extension, said bearing comprising inner and outer races, said extension including in its structure the outer race of said bearing means and means substantially sealing off communication between the interior and the exterior of said extension by way of the gap between said races comprising non-rotating sleeve means, and means holding said sleeve means in sealing relation with a non-rotating surface of the said hollow extension, said sleeve means closely encircling said journal so as thereby to form a seal between the sleeve means and the journal, and in which at least said portion of the journal which is encircled by the sleeve comprises attached ring means of such different metal from that of the sleeve that the sleeve has the lower co-efficient expansion.

FRANK CHRISTIAN FULCHER.